Jan. 28, 1958  E. J. HUNTER ET AL  2,821,434
AUTOMATIC IRRIGATION CONTROL APPARATUS
Filed Nov. 21, 1955  3 Sheets-Sheet 1

EDWIN J. HUNTER
LORENZO A. RICHARDS
INVENTORS

BY Lloyd Spencer
ATTORNEY

EDWIN J. HUNTER
LORENZO A. RICHARDS
INVENTORS

BY Lloyd Spencer
ATTORNEY

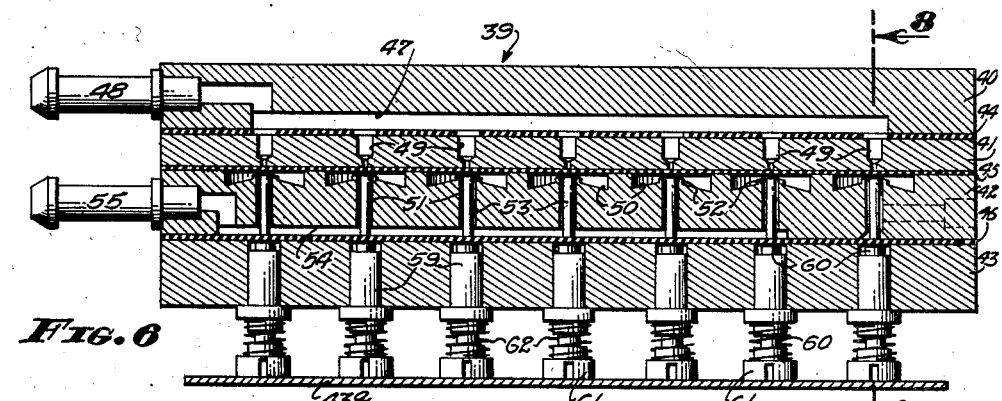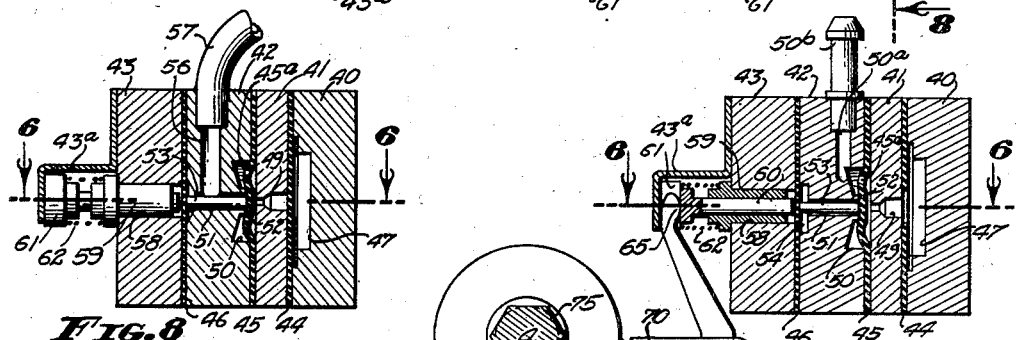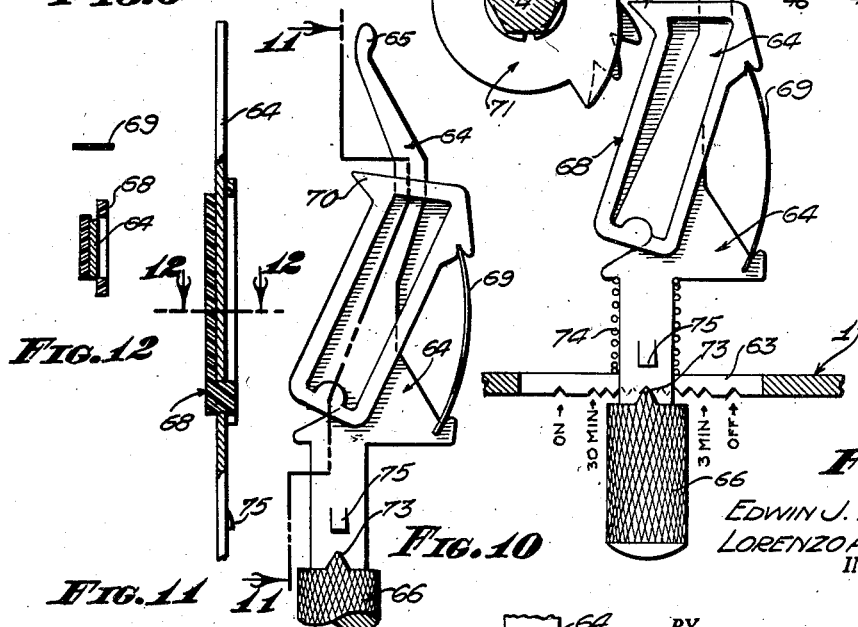

United States Patent Office 2,821,434
Patented Jan. 28, 1958

2,821,434

AUTOMATIC IRRIGATION CONTROL APPARATUS

Edwin J. Hunter and Lorenzo A. Richards, Riverside, Calif.

Application November 21, 1955, Serial No. 548,115

8 Claims. (Cl. 299—25)

This invention relates to automatic irrigation control apparatus, and included in the objects of this invention are:

First, to provide an automatic irrigation control apparatus wherein a compact bank of small pilot valves is operated by a timing mechanism in sequence or in any pre-selected order to effect corresponding operation of pilot responsive valves which control sections of an irrigation system.

Second, to provide an automatic irrigation control apparatus wherein a compact bank of time selection levers corresponding to the bank of pilot valves may be readily adjusted to control independently the length of time each section of the irrigation system is operated, as well as to shut off or turn on any section independently of the timing mechanism.

Third, to provide an automatic irrigation control apparatus wherein any irrigation section may be caused to operate once or intermittently during its portion of the irrigation cycle so as to minimize run-off while insuring adequate irrigation of areas in which excessive run-off constitutes a problem.

Fourth, to provide an automatic irrigation control apparatus which may utilize a moisture sensitive element such as shown in Patent Number 2,674,490, issued April 6, 1954, to Lorenzo A. Richards, entitled: Method and Apparatus for Irrigation Plants.

Fifth, to provide an automatic irrigation control apparatus wherein the moisture sensitive element operates a diaphragm located contiguous to said bank of pilot valves, movement of the diaphragm being utilized to withhold operation of the pilot valves until the soil moisture in a selected region of the area to be irrigated is depleted to a predetermined value and thereupon to initiate operation of the pilot valves in response to the timing mechanism.

Sixth, to provide an automatic irrigation control apparatus of this class wherein the moisture sensitive element is purged during the irrigation cycle to recondition the moisture sensitive element for a succeeding irrigation cycle.

With the foregoing and other objects in view as may appear hereinafter, reference is directed to the accompanying drawings in which:

Figure 6 is a further enlarged longitudinal sectional view of the pilot valve bank taken through 6—6 of Figs. 7 and 8, the control means being omitted.

Figure 7 is a transverse sectional view through 7—7 of Fig. 4 showing one of the pilot valves in connection with its control lever and cam.

Figure 8 is a transverse sectional view through 8—8 of Fig. 6 showing the purge valve.

Figure 9 is a fragmentary sectional view through 9—9 of Fig. 2.

Figure 10 is a fragmentary view of the control lever illustrating the lost motion connection between the control lever and cam follower lever.

Figure 11 is a fragmentary sectional view through 11—11 of Fig. 10.

Figure 12 is a transverse sectional view through 12—12 of Fig. 11.

Figure 1:
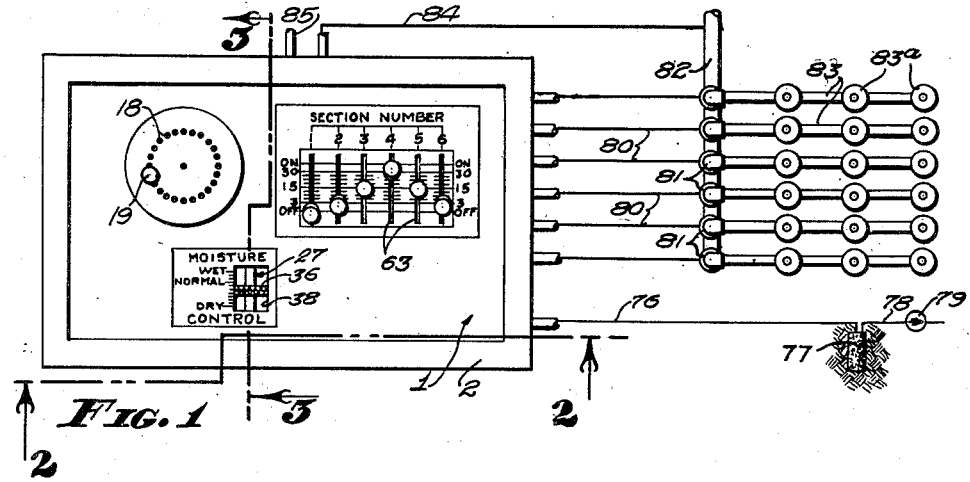
Figure 1 is a plan view of the automatic irrigation control apparatus showing the control panel and indicating diagrammatically the manner in which the control apparatus is connected to an irrigation system.
Figure 2:
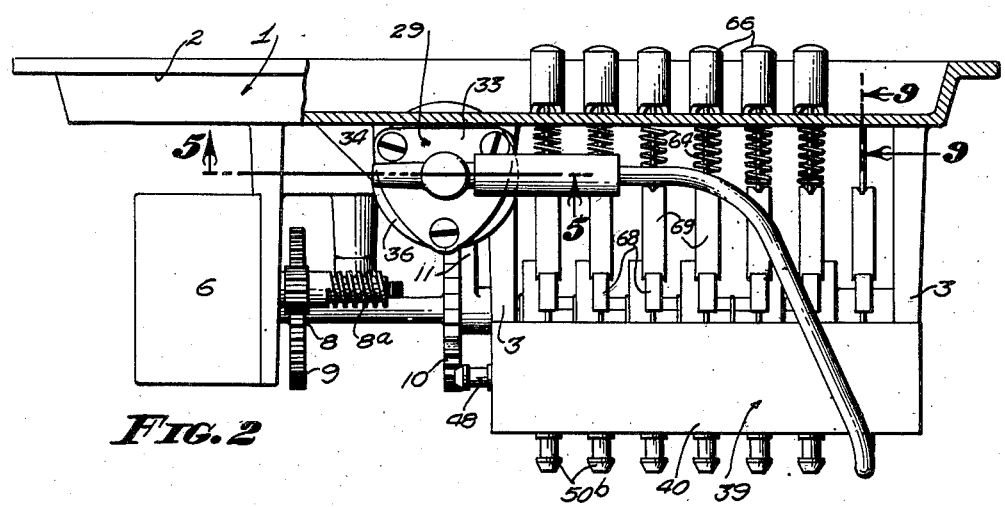
Figure 2 is an enlarged partial sectional, partial elevational view of the automatic irrigation control apparatus taken through 2—2 of Fig. 1.
Figure 3:
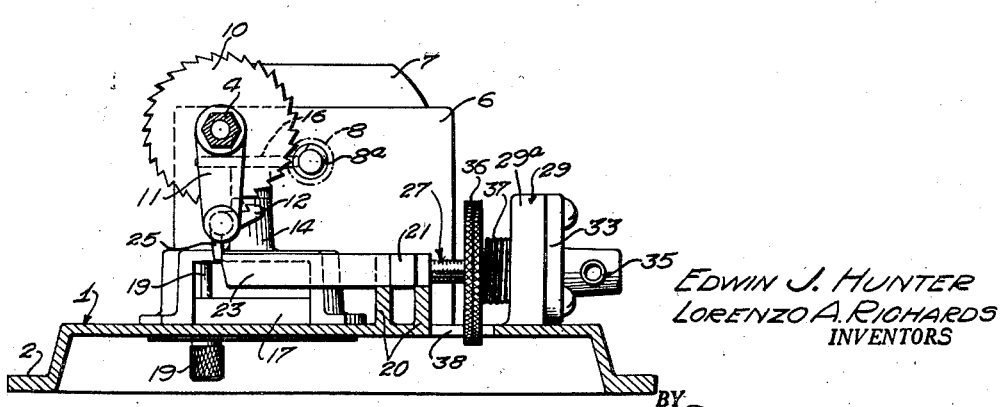
Figure 3 is a sectional view taken substantially through 3—3 of Fig. 1, with portions shown in elevation.

The automatic irrigation control apparatus is suspended under or disposed behind a mounting plate 1. The mounting plate is rectangular and provided with a flanged margin 2 so that it may be set on the top of a hollow rectangular supporting column, not shown, or in a corresponding aperture provided in a wall or other vertical surface. Extending from the under or back side of the mounting plate 1 is a pair of brackets 3 between which is mounted a cam shaft 4, which is shown as hexagonal in cross section, corresponding to the bank of six irrigation pilot valves to be described hereinafter.

A gear shaft 5 is disposed coaxially with the cam shaft, one end being journaled in a socket in the adjacent end of the cam shaft and the other end being supported by a bracket 6. The bracket 6 supports a clock type motor 7, having a drive shaft on which is provided a pinion gear 8 and a worm 8A. The pinion gear 8 drives a spur gear 9 at one end of the gear shaft 5. The other end of the shaft 5 is provided with a ratchet wheel 10. The adjacent end of the cam shaft 4 is provided with a lever arm 11 which carries a pawl 12 adapted to engage the ratchet wheel 10.

The mounting panel is provided between the bracket 6 and adjacent bracket 3 with a shallow, cylindrical housing 13 opening toward the upper or outer side of the mounting panel. The housing is provided with a bearing 14 directed perpendicular to the motor shaft and worm 8. The bearing 14 receives a shaft 15 having a worm gear 16 which is driven by the worm 8A. Within the housing, the shaft 15 is connected to a timing disk 17 having a ring of axially directed perforations 18 any one of which may receive a pin 19.

It is preferred that the motor shaft, worm 8A and pinion gear 8 turn at one revolution per hour; that the shaft 15 and timing disk 17 turn one revolution per twenty-four hours, and that the gear shaft and cam shaft turn one revolution per three hours. The timing disk 17 is exposed to the upper or outer side of the mounting plate and may be marked to indicate the twenty-four hours of a day, in which case twenty-four perforations 18 may be provided. One side of the housing 13 is notched to expose the back side of the timing disk 17.

A pair of lugs 20 extend from the back side of the mounting plate and are slotted transversely to define an axis extending substantially tangential to the timing disk 17. The transverse slots support a mounting head 21 from which extend substantially parallel, laterally flexible arms 22 and 23. The arm 22 terminates in a detent 24 positioned to be engaged by the end of the pin 19 projecting through a perforation 18. The extended end of the arm 23 is positioned for engagement with a lug 25 depending from the ratchet pawl 12. The arm 23 is provided with a mid-portion 26 offset from the arm 22.

Figure 5:
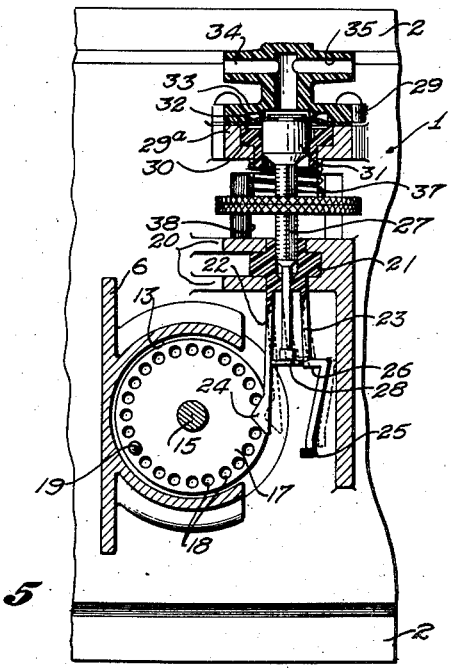
Figure 5 is a fragmentary sectional view thereof taken through 5—5 of Fig. 2, showing particularly the operation of the moisture sensitive control means.

The mounting head 21 is provided with a bore defining an axis extending between the arms 22 and 23 in which is slidably mounted a control rod 27. The control rod includes a reduced portion extending between the arms 22 and 23, having limited flexibility and terminating in a button 28. When the button 28 is in a retracted position clear of the offset portion 26, as shown in Fig. 5 movement of the arm 22, by engagement of its detent 24 with the pin 19, is transmitted through the button 28 to the arm 23 to move it laterally and free the lug 25 of the pawl 12. This causes the pawl 12 to engage the ratchet wheel 10 and cause the cam shaft to turn. In the meantime the pin 19 passes the detent 24, so that on completing one revolution, the lug 25 again engages the tip of the arm 23, disengaging the pawl 12 from the ratchet wheel 10.

If the button 28 is in its extended position, opposite the offset portion 26, movement of the arm 22 is not transmitted to the arm 23 and the cam shaft fails to turn. The button 28 may be positioned manually or in response to a moisture sensitive element of the type wherein a vacuum pressure is created as the soil moisture is depleted. A moisture sensitive element of this type is disclosed in the aforementioned Patent No. 2,674,490.

In order to utilize the vacuum pressure available by reason of the moisture sensitive element a vacuum responsive actuator 29 is provided. The vacuum pressure actuator includes a boss 29a which projects from the mounting plate 1 in spaced relation with the lugs 20. The boss is provided with a counterbored opening therethrough disposed coaxially with the control rod 27. Set in the opening is a bushing 30, in which is slidably but non-rotatably mounted an enlarged end 31 of the rod 27. Secured to this end is a diaphragm 32 which is clamped between the bushing 30 and a cover member 33. The cover member is secured to the boss 29a by suitable screws. The cover member is provided with a nipple 34 for connection to a vacuum line to be described hereinafter, and a nipple 35 for connection to a purge tube, also to be described hereinafter.

Figure 4:
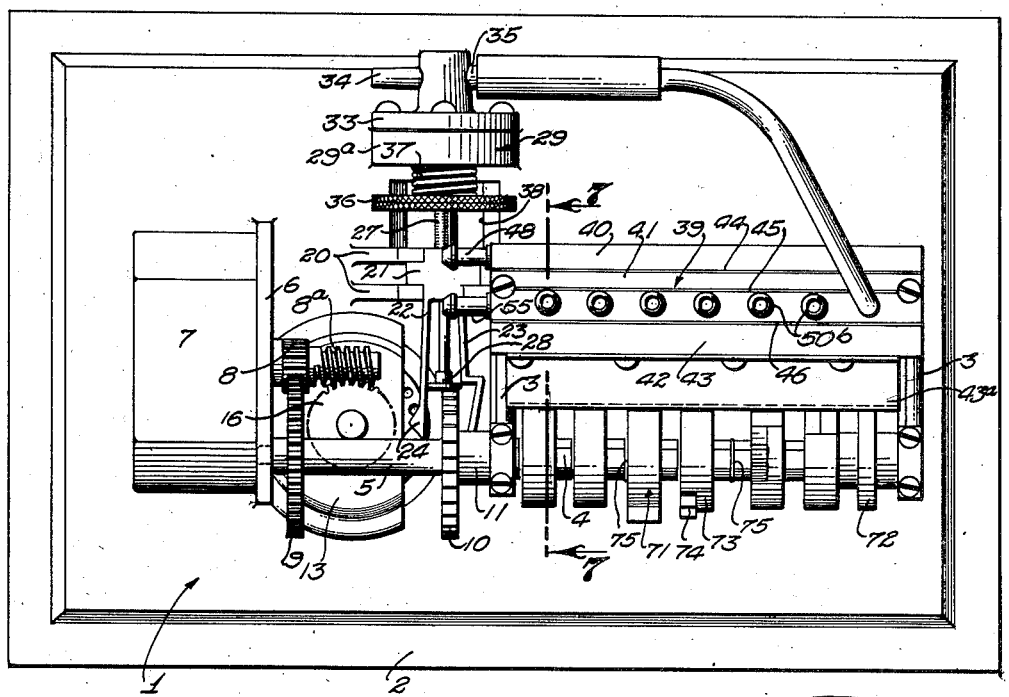
Figure 4 is an enlarged bottom view of the automatic irrigation control apparatus.

Between the boss 29a and the lugs 20, the control rod 27 receives a wheel nut 36 screwthreaded thereon. Between the wheel nut 36 and the boss 29a is a spring 37. The mounting plate 1 is provided with a slot 38 to expose the wheel nut so that it may be turned on the control rod from the front or upper side of the mounting plate. The spring 37 acts in opposition to the vacuum pressure on the cover member side of the diaphragm 32. As will be brought out hereinafter, the greater the vacuum pressure created by the moisture sensitive element the drier the soil, so that by adjusting the wheel nut 36 to increase spring tension the drier the soil must be before the button 28 can be drawn from its extended position shown in Fig. 4 to its retracted position shown in Fig. 5. By provision of a suitable scale on the outer or upper side of the mounting plate 1, as indicated in Fig. 1, the control apparatus may be set to drive the cam shaft when the preselected moisture condition exists. By turning the wheel nut until it bears against the lug 20, the control rod 27 may be drawn manually to the retracted position shown in Fig. 5 so as to bypass the moisture sensitive element.

Supported between the brackets 3 at one side of and offset from the cam shaft 4 is a pilot valve bank 39 comprising valve blocks 40, 41, 42 and 43 between which are interposed gaskets 44, 45 and 46. The valve blocks are secured together by suitably located screws.

The valve block 40 is provided with a distributor channel 47 connected at one end to a projecting nipple 48 which is connected to a source of water pressure. The valve block 41 is separated from the valve block 40 by the gasket 44. In the construction illustrated, the valve block 41 is provided with seven equally spaced transverse ports 49, six of which are concerned with six sections of an irrigation system, while the seventh is employed to effect purging of the moisture sensitive element as will be described hereinafter. The gasket 44 is ported for communication between the ports 49 and the distributor channel 47.

The valve block 42 is separated from the valve block 41 by the gasket 45 and is provided with a series of recesses coaxial with the ports 49 which form the valve chambers 50. Transverse bores 51 coaxial with the ports 49 extend through the block 42; their ends within the recesses terminating in valve seats 52 confronting but spaced from the gasket 45. The portions of the gasket 45 covering the recesses or valve chambers 50 form flexible diaphragms capable of sealingly engaging the ports 49 or the valve seats 51. Each diaphragm thus formed is provided with an offset port 45a shown in Figs. 7 and 8. Each of the six irrigation control pilot valve chambers 50 is intersected by a lateral passage 50a terminating in a nipple 50b. Each bore 51 loosely receives a push pin 53. The ends of the ports 49 covered by the gasket 45 are smaller in diameter than the bores 51 and push pins 53 so that the push pins may seal the gasket against the ports 49.

The opposite side of the valve block 42 from the valve chambers is provided with a collector channel 54 connecting the six bores 51 concerned with control of the irrigation sections. The collector channel is connected at one end to a nipple 55 adapted for connection to a bleed line. The seventh bore 51 is connected intermediate its ends to a lateral passage 56 connected with a purge tube 57 which leads to the nipple 35 of the vacuum responsive actuator 29.

The valve block 43 is separated from the valve block 42 by the gasket 46 which covers the collector channel 54 and the confronting end of the seventh bore 51. The valve block 43 is provided with transverse bores 58 disposed coaxially with the bores 51. Each bore 58 receives a bushing 59 terminating in a head externally of the valve block 43. The bushings 59 receive valve pins 60 terminating in slotted heads 61. Springs 62 urge the pins outwardly from the bushings 59. This movement is limited by a guard plate 43a suitably secured to the valve block 43.

In the construction illustrated, the mounting plate 1 is provided with six slots 63 corresponding to the six pilot valves of the pilot valve bank concerned with control of the irrigation sections. A control lever 64 is provided for each of all seven pilot valves, each lever is provided with an operating tip 65 which fits in the slot in the head 61 of the corresponding valve pin 60. The opposite ends of six levers 64 extend through the slots 63 and are provided with a knurled handle 66 as shown in Fig. 9; whereas the opposite end of the seventh lever 64 is pivotally restrained in a socket 67 formed in the mounting plate, as shown in Fig. 10.

The levers 64 extend transversely to and offset from the cam shaft 4 and may be made as sheet metal stampings, disposed edgewise to the cam shaft. Pivotally mounted on each control lever 64 for limited relative movement is a cam follower lever 68 which is urged in a direction toward the cam shaft 4 by a leaf spring 69. Each cam follower lever 68 is provided with a cam follower tip 70 which is adapted to engage a corresponding cam disk on the cam shaft 4.

Six cam disks 71 are provided for the six irrigation section control pilot valves, and a special cam disk 72 is provided for the seventh or purging valve. Each cam disk 71 is provided with a single lobe cam 73 providing a single rise over approximately one-sixth of the circumference of the cam disk. At one side of the single lobe cam 73 is a multiple lobe cam 74, showing in the illustration, three lobes. Each cam disk is slidable on the cam shaft between stop rings 75 so that either the single or the multiple lobe cam may be brought into register with a corresponding cam follower tip 70.

The cam disks 71 are preferably offset one-sixth a revolution from each other so that the six irrigation control pilot valves may operate in sequence during one revolution of the cam shaft. The cam disk 72 has a single lobe and positioned so that the seventh or purge pilot valve operates and closes within the irrigation cycle determined by a revolution of the cam shaft.

By shifting the cam disks 71 each irrigation control pilot valve may be operated once or several times during its period of operation as will be brought out in more detail hereinafter. By shifting the handles 66 along the slots 63 the arcs of the cam lobes engaged by the cam follower tips may be varied from the full length of the lobes to the radial extremities thereof, or the handles 66 may be positioned so that cam follower tips do not engage the cam lobes. The amount of movement of the levers to effect operation of the pilot valves is much less than the rise of the cam lobes; excess movement being taken up by displacement of the cam follower levers 68 relative to the pilot valve levers 64.

To facilitate positioning of the handles 66, the upper or outer surface of the mounting plate 1 on either side of the slots 63 may be scored and the handles provided with prongs 73 which engage therein. Also the prongs are yieldably held in place by springs 74 surrounding the levers 64 on the back side of the mounting plate 1. A lug 75 on each lever limits outward movement of the handle.

Operation of the automatic irrigation control apparatus is as follows:

The nipple 35 of the vacuum responsive actuator 29 is connected by a vacuum line 76 of small diameter to a soil moisture sensitive element 77. This is a hollow, sealed, porous cell from which extends a small discharge line 78 having a check valve 79 to prevent back flow. The soil moisture sensitive element is judiciously located in the area to be irrigated and is, as well as the lines 76 and 78, completely filled with water. When the moisture sensitive element is so arranged a vacuum or sub-atmospheric pressure will be established therein which varies in correspondence with the moisture condition of the surrounding soil; that is the vacuum pressure will increase (absolute pressure will decrease) with depletion of the soil moisture.

Each of the nipples 50b communicating with the valve chambers 50 are connected to small pilot lines 80 to pilot operated flow valves 81. These may be conventional valves having pressure chambers which when bled cause the flow valve to open and when pressurized cause the flow valve to close. The flow valves 81 are shown as connected to a common water supply line 82, and arranged to discharge into conventional irrigation sections 83 comprising one or more sprinkler heads 83a, or other irrigation devices.

The nipple 48 leading from the distributor channel is connected to a pressure line 84 of small diameter shown as connected to the water supply line 82. A bleed line 85 leads from the nipple 55 and the collector channel 54 and discharges into the ground or other convenient place.

After the various connections are established, the clock motor may be started and the timing pin 19 may be set in any selected perforation 18 corresponding to the time it is desired to initiate irrigation. When the timing pin 19 engages the detent 24 at the end of the arm 22 the irrigation cycle may be initiated, providing the button 28 is in its retracted position to transmit movement of the arm 22 to the arm 23. As pointed out hereinbefore, the button may occupy its retracted position if the vacuum pressure in the vacuum responsive actuator 29 is sufficient to overcome the spring 37, or the wheel nut 36 is adjusted to hold the button retracted.

If movement of the detent 24 is transmitted to the tip of the arm 23, the pawl 12 engages the ratchet wheel 10 (which turns continuously) and causes the cam shaft 4 with its cam disks 71 and 72 to turn one revolution. In doing so each of the irrigation control pilot valves is operated in sequence and the purge valve is also operated.

Each irrigation control pilot valve operates as follows:

Normally, each irrigation control pilot valve is in the condition shown in Fig. 7; that is, the diaphragm portion of the gasket 45 is forced by water pressure to seal against the valve seat 52 so as to close the bore 51 and prevent escape of water to the bleed line 85. The offset port 45a, however affords communication from the pressure line 84 and distributor channel 47 through the nipple 50b to the corresponding pilot line 80 and flow valve 81, so as to pressurize the flow valve and hold it closed.

When the cam lobe of a corresponding cam disk engages a cam follower tip 70 of a cam follower lever 68 and causes the lever 64 to depress the valve pin 60, movement of the valve pin 60 is transmitted through the gasket 46 to the push pin 53 forcing the diaphragm portion of the gasket 45 away from the seat 52 and against the valve port 49 to close the valve port 49. This movement establishes communication between the pilot line 80 and the bleed line 85, permitting flow from the pressure chamber of the flow valve 81 and causing the flow valve to open.

By reason of the over-travel provided between the cam follower lever 68 and lever 64 the period in which a flow valve 81 is on may be varied. Furthermore, by providing for extra movement of the lever 64, the cam follower tip may be moved clear of the cam lobe so that the corresponding flow valve 81 and irrigation section remains "off." Still further, extreme movement of the lever 64 in the other direction causes the cam follower tip to ride continuously on the cam and hold the flow valve 81 and corresponding irrigation section in an "on" position. Thus, each irrigation section may be manually set in an "off" or an "on" position, or arranged when actuated by the control cams to be operated for a short or a long period. By way of illustration, the irrigation period of each irrigation section may be independently adjusted from three to thirty minutes, if the entire irrigation cycle is arranged for a three hour period and six sections are provided.

The purge valve, which constitutes the seventh of the bank of valves, is operated for a fixed brief period by its cam 72. In this case, the purge valve is normally in the position shown in Fig. 8 wherein the water pressure holds the diaphragm portion of the gasket 45 against the valve seat 52 so as to seal the purge tube 57 and permit the development of a vacuum in the soil moisture sensitive element, vacuum line 76 and vacuum responsive actuator 29.

As it is desired to restore atmospheric pressure in the soil moisture sensitive element during the irrigation cycle, the diaphragm portion of the gasket 45 is slowly moved from the seat 52 to the port 49 by action of the cam 72 through the cam follower lever 69, lever 64, valve pin 60, and push pin 53. During this movement, water may flow from the port 49 through the diaphragm port 45a and to the vacuum line 76 and soil moisture sensitive element, then out through the discharge line 78 and check valve 79. This flow of water not only restores the water pressure in the soil moisture sensitive element to atmospheric pressure, but also purges the system of any entrapped air. The removal of entrapped or accumulated air is highly desirable as presence of air changes the responsiveness of the soil moisture sensitive element to the soil moisture conditions and thus affects its operation.

If, for any reason such as excessive moisture demand, or insufficient irrigation cycle, the region in the vicinity of the soil moisture sensitive element should be depleted of water during the twenty-four hours provided by the timing mechanism, then the irrigation cycle will repeat each twenty-four hours. However, if the soil moisture is not depleted in that period, irrigation will be withheld until demand is established.

By adjustment of the wheel nut 36 the moisture condition at which irrigation is initiated may be readily adjusted; or if desired, the apparatus may be operated on a twenty-four hour or other selected time cycle without use of the soil moisture sensitive element.

By reason of the independent adjustment of the pilot valves, the irrigation periods of the different irrigation sections may be adjusted, shut off, or turned on, all from the control apparatus. Also, by reason of the single and multiple lobe cams intermittent irrigation of any section may be resorted to for the purpose of minimizing run-off where this condition is a factor.

Having shown and described a particular embodiment of the invention it is not desired to be limited thereto, but the scope of this invention is to be determined by the constructions, combinations and arrangements embraced in the appended claims.

We claim:

1. An automatic irrigation control apparatus for an irrigation system having a plurality of irrigation sections, and a pilot operated flow valve for each section, comprising; a bank of pilot valves, one for each flow valve; a series of control levers for operating said pilot valves; a series of cams having lobes arranged to engage said levers for preselected periods to effect operation of said pilot valves; means for moving each of said levers independently with its cam thereby to change the period of engagement with its cam thereby to change the operating period of the corresponding pilot valve; a cam shaft for said cams; a drive motor; a clutch for operatively connecting said cam shaft and motor; a clutch operating means normally holding said clutch disengaged; a timing means driven by said motor and periodically connected with said clutch operating means to cause periodic engagement of said clutch to effect intermittent rotation of said cam shaft thereby to cause periodic operation of said pilot valves; and a device interposed in said clutch operating means for rendering said clutch operating means ineffective to release said clutch thereby to postpone operation of said pilot valves and operation of said irrigation sections.

2. In an automatic irrigation control apparatus, the combination of: a pilot valve; a control lever having a pilot valve operating end and a fulcrum end means including a series of notches for selectively receiving said fulcrum end; a cam positioned for operative engagement with the midportion of said control lever; and means for shifting the fulcrum end of said control lever between said notches thereby to vary the operative relation between said control lever and cam so as to vary correspondingly the operation of said pilot valve.

3. An automatic irrigation control apparatus for an irrigation system having a plurality of irrigation sections, and a pilot operated flow valve for each section, comprising: a bank of pilot valves, one for each of said flow valves; each pilot valve having means defining a valve chamber; a diaphragm covering an end of said valve chamber and having an offset perforation therein; an inlet port at the side of said diaphragm opposite from said valve chamber; a bleed passage communicating with said valve chamber in coaxial relation with said inlet port and terminating in a valve seat confronting said inlet port; a pilot line passage leading laterally from said valve chamber and connected with a flow valve; said diaphragm being engageable with said valve seat to permit flow from said inlet port through said perforation to said pilot line passage, and being sealingly engageable with said inlet port to permit flow from said pilot line passage through said valve seat and bleed passage.

4. An automatic irrigation control apparatus as set forth in claim 3 which further comprises: a push pin operable through said bleed passage to close said inlet and open said pilot line to said bleed passage; an internally accessible means for operating said push pin; a control lever having an operating end engageable with said means and a fulcrum end; means for adjustably positioning said fulcrum end; a cam follower lever pivotally connected to said control lever for limited relative movement; a spring urging said cam follower lever to an extreme position relative to said control lever whereby said levers have a limited lost-motion connection therebetween; a cam having a lobe engageable with said cam follower lever to operate said pilot valve, the extent of engagement being determined by said fulcrum adjusting means thereby to control the operating period of said pilot valve, the lost motion connection between said control lever and cam follower lever permitting over-travel of said cam lobe.

5. An automatic control apparatus, comprising: a housing structure including a mounting panel forming a wall thereof, said mounting panel having a series of slits and a set of fulcrum pivoting elements bordering each slit; a plurality of levers, each lever having a fulcrum adapted to be seated in any of the corresponding set of fulcrum pivoting elements, a handle externally of said mounting panel for manual engagement to shift the location of said fulcrum, each lever also including a cam engaging element; a series of cams disposed for engagement by the cam engaging elements of corresponding levers, each of said cams being shaped to vary the duration of engagement with its cam engaging element in accordance with the position of the corresponding fulcrum; and control devices engageable by said levers in proportion to the engagement of said cams and cam engagement elements.

6. An automatic irrigation control apparatus wherein a plurality of pilot valves are arranged for operating corresponding irrigation valves of a series of irrigation sections, said apparatus comprising: a housing structure including a mounting panel; means for supporting said pilot valves on the back side thereof; a series of control levers engageable with said pilot valves, each lever having a fulcrum; a set of fulcrum pivoting elements for each fulcrum to variously locate the fulcrum of a corresponding control lever; handle means for each control lever manually engageable from the exterior of said mounting panel; and cam means for actuating said control levers individually, said cam means being shaped to provide different periods of engagement with said control levers in accordance with the position of the corresponding handles and fulcrums.

7. An automatic irrigation control apparatus wherein a plurality of pilot valves are arranged for the control of irrigation valves of a series of irrigation sections, and wherein means is provided which detects soil moisture depletion, said apparatus comprising: a housing structure including a mounting panel; means for supporting said pilot valves on the back side thereof; a series of control levers engageable with said pilot valves, each lever having a fulcrum; a set of fulcrum pivoting elements for each fulcrum to variously locate the fulcrum position of a corresponding control lever; handle means for each control lever manually engageable from the exterior of said mounting panel; cam means for actuating said control levers individually, said cam means being shaped to provide different periods of engagement with said control levers in accordance with the position of the corresponding handles and fulcrums; and adjustable means responsive to said soil moisture detecting means, including a manually engageable element accessible from the front of said mounting panel for initiating operation of said cam means.

8. An automatic irrigation control apparatus wherein a plurality of pilot valves are arranged for operating corresponding irrigation valves controlling a series of irrigation sections, said apparatus comprising: a plurality of control cam units for said pilot valves; a common drive shaft therefor; and a plurality of levers individually connecting each control cam unit and corresponding pilot valve, each lever having a fulcrum element and manual means for shifting the location of the fulcrum element thereby to vary the duration of engagement with the corresponding control cam unit; each control cam unit including a single cam element and an axially displaced set of cam elements, each control cam unit being axially displaceable on said drive shaft to bring said cam element or said set of cam elements into selective engagement with the corresponding lever.

References Cited in the file of this patent
UNITED STATES PATENTS

| | | |
|---|---|---|
| 1,828,126 | Brown | Oct. 20, 1931 |
| 2,058,868 | Hansen | Oct. 27, 1936 |
| 2,122,398 | Harrison | July 5, 1938 |
| 2,442,835 | Allen | June 8, 1948 |
| 2,510,465 | Ellis | June 6, 1950 |
| 2,638,110 | Parks | May 12, 1953 |
| 2,674,490 | Richards | Apr. 6, 1954 |